United States Patent
Vigoureux et al.

(10) Patent No.: US 8,693,349 B2
(45) Date of Patent: Apr. 8, 2014

(54) METHODS FOR ESTABLISHING A TRAFFIC CONNECTION AND AN ASSOCIATED MONITORING CONNECTION

(75) Inventors: Martin Vigoureux, Paris (FR); Marc Lorret, Marcoussis (FR)

(73) Assignee: Alcatel Lucent, Paris (FR)

(*) Notice: Subject to any disclaimer, the term of this patent is extended or adjusted under 35 U.S.C. 154(b) by 347 days.

(21) Appl. No.: 12/737,804

(22) PCT Filed: Aug. 26, 2008

(86) PCT No.: PCT/IB2008/054484
§ 371 (c)(1),
(2), (4) Date: Apr. 1, 2011

(87) PCT Pub. No.: WO2010/023511
PCT Pub. Date: Mar. 4, 2010

(65) Prior Publication Data
US 2011/0182185 A1  Jul. 28, 2011

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)
H04W 4/00 (2009.01)

(52) U.S. Cl.
USPC ........................ 370/241.1; 370/216; 370/328

(58) Field of Classification Search
None
See application file for complete search history.

(56) References Cited

U.S. PATENT DOCUMENTS

| | | | |
|---|---|---|---|
| 2006/0203720 A1* | 9/2006 | Kano | 370/228 |
| 2006/0268680 A1* | 11/2006 | Roberts et al. | 370/216 |
| 2008/0112330 A1* | 5/2008 | He et al. | 370/241.1 |
| 2010/0290345 A1* | 11/2010 | Ger et al. | 370/241.1 |

OTHER PUBLICATIONS

Awduche Movav Networks D et al: "RSVP-TE: Extensions to RSVP fo LSP Tunnels" IETF Standard, Internet Engineering Task Force, IETC, CH, Dec. 1, 2001, pp. 1-61.
Cavendish D et al: "Operation, administration, and maintenance in MPLS networks" IEEE Communications Magazine, IEEE Service Center, Piscataway, US, vol. 42, No. 10, Oct. 1, 2004, pp. 91-99.
Awduche J. Malcolm j Agogbua M O'Dell J McManus UUNET (MCI Worldcom) D: "Requirements for Traffic Engineering Over MPLS; rfc2701.txt" IETF Standard, Internet Engineering Task Force, IETF, CH, Sep. 1, 1999.

* cited by examiner

*Primary Examiner* — Faruk Hamza
*Assistant Examiner* — Diane Lo
(74) *Attorney, Agent, or Firm* — Carmen Patti Law Group, LLC (57) ABSTRACT

A method for establishing a monitoring connection associated to a traffic connection established in a network e.g. of MPLS type, the method comprising the steps of:
sending a connection establishment message from a first node (B) to a second node (D) of the communication network to establish a monitoring connection (6) between the first and second nodes, wherein the first and second nodes are disposed in a path of the traffic connection and the connection establishment message is sent along the traffic connection path,
sending a make-before-break request from the first node (B) to an ingress node (A) of the traffic connection to cause the ingress node to re-establish the traffic connection along the traffic connection path using a make-before-break signaling procedure,
at the first node, processing a re-establishment signaling message sent by the ingress node so as to encapsulate the re-established traffic connection (5) into the monitoring connection (6).

13 Claims, 5 Drawing Sheets

FIG_1

FIG_2

FIG_3

```
<Path Message> ::=      <Common Header>  [ <INTEGRITY>    ]
                     [  [<MESSAGE ID_ACK>  I <MESSAGE_ID_NACK>]...]

[   <MESSAGE_ID>    ]
                     <SESSION>   <RSVP_HOP>
                     <TIME_VALUES>
                     [   <EXPLICIT_ROUTE>   ]←——34
                     <LABEL_REQUEST>
                     [   <PROTECTION>  ]
                     [   <LABEL_SET>   ]
                     [   <SESSION ATTRIBUTE>  ]
                     [   <NOTIFY_REQUEST>   ]
                     [   <ADMIN_STATUS>   ]
                     [   <POLICY_DATA>  ]
                     [   <TCME_DESIRED>  ]←——32
                     <sender descriptor>

<sender descriptor> ::=   <SENDER_TEMPLATE>
                     <SENDER_TSPEC>
                     [   <ADSPEC>   ]
                     [   <RECORD_ROUTE>   ]
                     [   <SUGGESTED_LABEL>   ]
                     [   <RECOVERY_LABEL>   ]
```

FIG_6

FIG_5

METHODS FOR ESTABLISHING A TRAFFIC CONNECTION AND AN ASSOCIATED MONITORING CONNECTION

FIELD OF THE INVENTION

The invention relates to the technical field of communication networks implementing connection-oriented switching techniques.

BACKGROUND OF THE INVENTION

Multi Protocol Label Switching techniques such as standard MPLS and various extensions, e.g. MPLS Transport Profile and Generalized MPLS, have been developed to implement a unified control plane providing traffic-engineering capabilities over a variety of network technologies. Fault management or performance management functions in a communication network are generally described as OAM (operations, administration and maintenance). Standards for MPLS OAM are still in a state of development.

SUMMARY OF THE INVENTION

It is an object of the invention to provide methods for implementing OAM functions in a connection-oriented network, e.g. of the MPLS type.

To achieve a first object of the invention, embodiments provide a method for establishing a traffic connection and an associated monitoring connection in a communication network, the method comprising the steps of:

sending a first connection establishment message from an ingress node of the traffic connection along a path of the traffic connection to initiate the establishment of the traffic connection, wherein the connection establishment message comprises a monitoring connection request designating a first and a second node of the connection path, intercepting the first connection establishment message at the designated first node of the connection path, sending a second connection establishment message from the designated first node along the connection path for establishing the monitoring connection between the designated first and second nodes of the connection path, and sending the first connection setup message from the designated first node along the connection path to resume and complete the establishment of the traffic connection, wherein the traffic connection is encapsulated into the monitoring connection between the designated first and a second nodes of the connection path.

Further embodiments of the method may include one or more of the following features:

the traffic connection and associated monitoring connection are label-switched paths and the traffic connection is encapsulated into the monitoring connection through label stacking.

the step of sending an OAM flow between the first and second nodes through the monitoring connection. An OAM flow refers to a set of protocol data units or messages that enables to perform fault management or performance management functions over the segment of the connection path located between the monitoring connection end points, i.e. the first and second nodes.

the traffic connection and associated monitoring connection are established with an identical bandwidth and/or identical traffic engineering parameters. This measure enables to enforce an exclusive association between the monitoring connection and associated traffic connection.

the first and second connection establishment messages are in accordance with the RSVP-TE protocol.

the monitoring connection request comprises an object in an RSVP-TE Path message, said object comprising an identifier of the first node and an identifier of the second node.

Embodiments of the invention provide also a node controller for a network node, the controller comprising a signaling module adapted to perform operations comprising:

processing a received first connection establishment message, the first connection establishment message comprising connection parameters for establishing a traffic connection along a connection path, the first connection establishment message comprising a monitoring connection request, detecting that the monitoring connection request designates the network node in which the node controller is installed, sending a second connection establishment message along the connection path in response to said detection, in order to establish a monitoring connection between said network node and another node of the connection path designated in the monitoring connection request, and sending the first connection setup message along the connection path to resume the establishment of the traffic connection in such a way that the traffic connection is encapsulated into the monitoring connection between said network node and the other node designated in the monitoring connection request.

Further embodiments of the controller may include one or more of the following features:

an OAM module adapted to send an OAM flow to the other node through the monitoring connection.

the signaling module is adapted to generate an error message in response to detecting that the monitoring connection request designates a network node that is not disposed in the connection path.

the signaling module is adapted to configure a switching table so as to associate an incoming label of the traffic connection with an outgoing label of the monitoring connection.

Embodiments of the invention provide also a machine-readable medium to provide instructions, which when executed by a processor in a node controller causes the node controller to perform operations comprising: processing a received first connection establishment message, the first connection establishment message comprising connection parameters for establishing a traffic connection along a connection path, the first connection establishment message comprising a monitoring connection request, detecting that the monitoring connection request designates a network node in which the node controller is installed, sending a second connection establishment message along the connection path in response to said detection, in order to establish a monitoring connection between said network node and another node of the connection path designated in the monitoring connection request, and sending the first connection setup message along the connection path to resume the establishment of the traffic connection in such a way that the traffic connection is encapsulated into the monitoring connection between said network node and the other node designated in the monitoring connection request.

To achieve a second object of the invention, embodiments provide a method for establishing a monitoring connection associated to a traffic connection established in a communication network, the method comprising the steps of:

sending a connection establishment message from a first node to a second node of the communication network to establish a monitoring connection between the first and second nodes, wherein the first and second nodes are disposed in a path of the traffic connection and the connection establishment message is sent along the traffic connection path, sending a make-before-break request from the first node to an ingress node of the traffic connection to cause the ingress node to re-establish the traffic connection along the traffic connection path using a make-before-break signaling procedure, and at the first node, processing a re-establishment signaling message sent by the ingress node so as to encapsulate the re-established traffic connection into the monitoring connection.

Further embodiments of the method may include one or more of the following features:

- the traffic connection and associated monitoring connection are label-switched paths and the re-established traffic connection is encapsulated into the monitoring connection through label stacking.
- the step of sending an OAM flow between the first and second nodes through the monitoring connection.
- the monitoring connection is established with a same bandwidth as the traffic connection and/or identical traffic engineering parameters.
- the connection establishment message and the re-establishment signaling message are in accordance with the RSVP-TE protocol.
- the make-before-break request comprises an identifier of the first node and/or an identifier of the second node. These identifiers may be IP addresses or other.
- the make-before-break request comprises an identifier of the monitoring connection.
- the make-before-break request comprises an object in an RSVP-TE Notify message.

Embodiments of the invention provide also a node controller for a network node, the controller comprising a signaling module adapted to perform operations comprising:

sending a connection establishment message from the network node in which the node controller is installed to another node of a communication network to establish a monitoring connection between the said nodes, wherein the said nodes are disposed in a path of a traffic connection established in the communication network and the connection establishment message is sent along a path of the traffic connection, sending a make-before-break request to an ingress node of the traffic connection to cause the ingress node to re-establish the traffic connection along the traffic connection path using a make-before-break signaling procedure, and processing a re-establishment signaling message received from the ingress node so as to encapsulate the re-established traffic connection into the monitoring connection.

Embodiments of the invention provide also a machine-readable medium to provide instructions, which when executed by a processor in a node controller causes the node controller to perform operations comprising:

sending a connection establishment message from a network node in which the node controller is installed to another node of a communication network to establish a monitoring connection between the said nodes, wherein the said nodes are disposed in a path of a traffic connection established in the communication network and the connection establishment message is sent along a path of the traffic connection, sending a make-before-break request to an ingress node of the traffic connection to cause the ingress node to re-establish the traffic connection along the traffic connection path using a make-before-break signaling procedure, and processing a re-establishment signaling message received from the ingress node so as to encapsulate the re-established traffic connection into the monitoring connection.

Aspects of the invention are based on the idea of using a distributed control plane to automate the establishment of a monitoring connection, i.e. a connection suitable for OAM flows, in a connection-oriented network, e.g. of the MPLS type. Aspects of the invention stem from the idea of establishing the monitoring connection at the same time as an associated traffic connection. Other aspects of the invention stem from the idea of establishing the monitoring connection after the associated traffic connection has been created. Other aspects of the invention are based on the idea that a need for a monitoring connection may arise and become apparent at different points in a network.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE PREFERRED EMBODIMENTS

Figure 1:
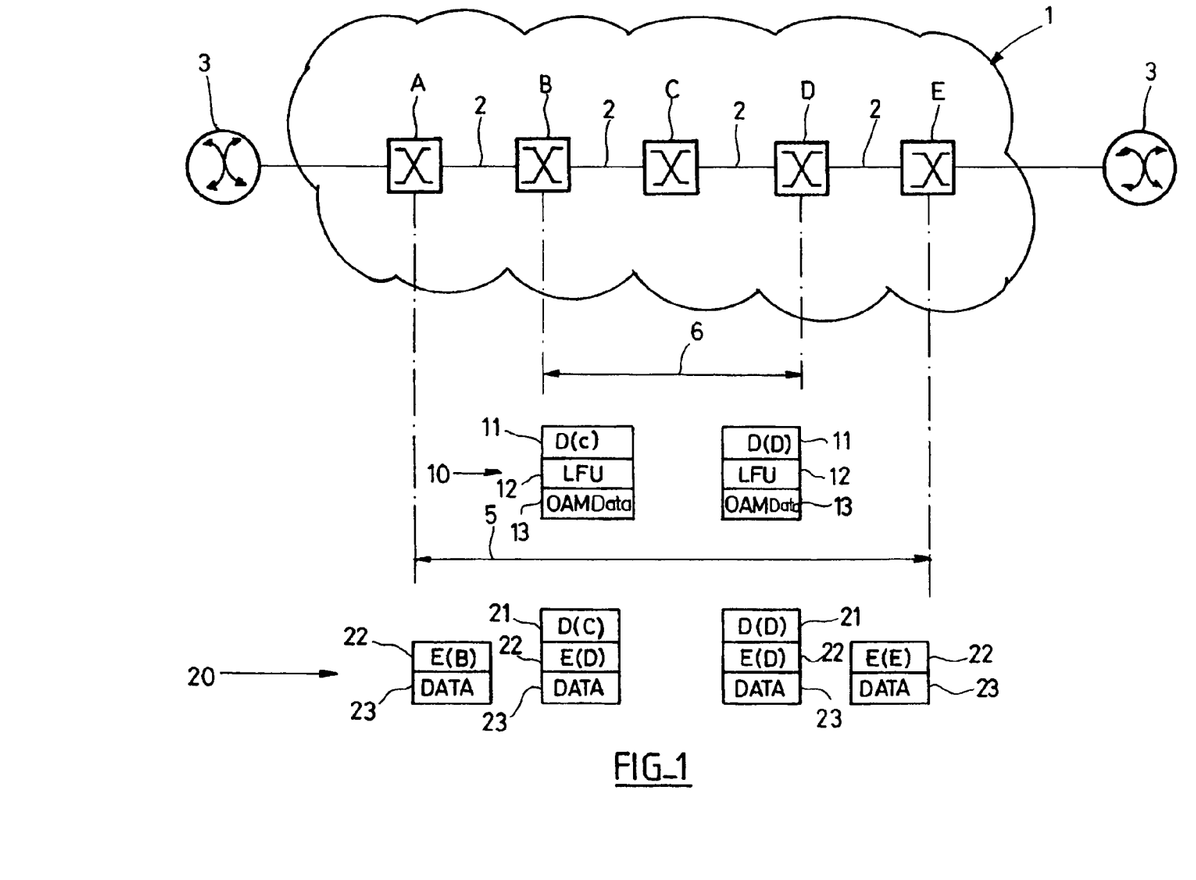
FIG. 1 is a schematic representation of a communication network comprising a traffic connection and an associated monitoring connection, which may be established by using embodiments of the invention.

With reference to FIG. 1, an MPLS network 1 comprises a plurality of nodes A, B, C, D, E connected by physical links 2. The number of nodes, number of links and topology shown are purely illustrative and not limitative. The MPLS network 1 may include one or more domains. The data plane technology can be of any type that MPLS control planes currently supports or will support in the future, e.g. all-optical, WDM, SONET, SDH, Ethernet, IP and others. The methods described below are preferably used in networks where the labels are explicit, e.g. with a packet-type data plane technology.

Nodes A and E are edge nodes of the MPLS network 1 and can exchange traffic with client devices 3, e.g. user-terminals, IP routers or other. A traffic connection 5, which is implemented as a Label-Switched Path (LSP) in MPLS terminology, is established between nodes A and E along a path going through nodes B, C and D in this order to carry a data flow, e.g. client data coming from a client device 3. As is well-known in the field of MPLS networks, the LSP 5 may have specific traffic parameters for the purpose of traffic engineering, e.g. in terms of reserved bandwidth, quality of service parameters, protection and others. The LSP 5 may be unidirectional or bidirectional. The description below will only refer to a flow going from node A to node E. The data forwarding techniques are quite similar in the reverse direction, if any.

In order to perform OAM functions relating to a segment of the path of LSP 5, namely the segment B-C-D, a monitoring connection 6 is established between two end-nodes of the segment, namely node B and node D. The end nodes of the monitoring connection 6 can be referred to as Maintenance End Points (MEP). In this embodiment, the monitoring connection 6 is also an LSP. The monitoring connection 6 serves to transport OAM packets in a way that follows the same data path, i.e. uses the same data plane components, as the traffic carried by connection 5. This ensures that the information relating to network performance or network faults, which can be derived from the OAM packets carried by connection 6, truly reflects the network performance or network faults which is experienced by the traffic carried by connection 5 along that segment. To achieve that requirement, LSP 5 is encapsulated into (i.e. tunneled through) LSP 6 along the segment B-C-D. If LSP 5 is bidirectional, LSP 6 is preferably bidirectional as well, to allow performance monitoring in both directions.

In a preferred embodiment, the LSP 6 is exclusively associated to LSP 5, i.e. it is not allowed to tunnel any other traffic than the traffic of LSP 5. In addition, the LSP 6 carries the OAM packets inserted by one or both MEPs. In the context of MPLS, the LSP 6 with those features can be referred to as a Tandem Connection Maintenance Entity LSP (TCME-LSP).

The MEPs B and D are capable of inserting OAM packets into and/or extracting OAM packets from the monitoring connection 6 and each comprise an OAM module that processes those OAM packets to perform OAM functions. Such OAM functions include for example one or more of the following functions defined by the International Telecommunication Union (ITU):

Continuity Check: Continuity Check (CC) is a function that is used to detect loss of continuity between MEPs. CC is useful for applications like Fault Management, Performance Monitoring and Protection Switching.

Connectivity Verification Connectivity Verification (CV) is a function that is used to check connectivity between MEPs in a single maintenance domain.

Alarm Suppression: Alarm Suppression is a function that is used by a server layer MEP to notify a failure condition to its client layer MEP(s) in order to suppress alarms that may be generated by maintenance domains of the client layer as a result of the failure condition in the server layer.

Lock Indication: Lock Indication is a function that is used to indicate an administrative locking of a server layer MEP which may result in consequential interruption of data traffic forwarding towards the client layer MEP(s) expecting this traffic. The reception of a Lock Indication allows a MEP to differentiate between a defect condition and an administrative locking action at the server layer MEP.

Packet Loss Measurement: Packet Loss Measurement is a function that is used to measure packet loss ratio between a pair of MEPs. Packet Loss Ratio is the ratio of the service packets (e.g. OAM packets) not delivered to the total number of service packets transmitted during a set time interval. The number of service packets not delivered is the difference between the number of service packets transmitted by the source node and the number of service packets received at the destination node. Packet loss Measurements can be performed by a MEP to measure near-end packet loss on unidirectional connections and near-end and far-end packet loss on bidirectional connections. Near-end packet loss refers to packet loss associated with ingress data packets while far-end packet loss refers to packet loss associated with egress data packets.

Diagnostic Test: A diagnostic test is a function that is used between MEPs to verify bandwidth throughput, packet loss, bit errors, and others.

Trace-route: Trace-route is a function that is used to determine the route of a connection across the MPLS transport network.

Delay Measurement: Delay Measurement is a function that is used to measure one-way or two-way delay of a packet transmission between a pair of MEPs. One-way packet delay is the time elapsed from the start of transmission of the first bit of the packet by a source node until the reception of the first bit of that packet by the destination node. Two-way packet delay is the time elapsed from the start of transmission of the first bit of the packet by a source node until the reception of the last bit of the loop-backed packet by the same source node, when the loopback is performed at the destination node of the packet.

Remote Defect Indication: Remote Defect Indication (RDI) is a function used by a MEP to notify its peer MEP of a detection of a defect on a bi-directional connection between them.

Client Signal Fail: Client Signal Fail function (CSF) is used to propagate a Client Failure indication to the far-end sink when alarm suppression in the client layer is not supported. Upon receiving a packet with CSF information a MEP detects a client-layer failure condition and notifies its client-layer. Upon receiving signal fail indication from its client-layer the MEP should immediately start transmitting periodic packets with CSF information. A MEP should continue to transmit periodic packets with CSF information until the client-layer failure indication is removed.

The monitoring connection 6 could be established between any two nodes of the traffic connection 5. FIG. 1 is purely illustrative in this respect. It is also possible to have several monitoring connections established along respective non-overlapping segments of a given traffic connection. In embodiments, several monitoring connections, e.g. TCME-LSPs, are nested into one another, e.g. to support monitoring functions at various topological levels of the network (whole path, path segment, single hop, single management domain, multiple management domains) and/or to monitor corresponding, mutually nested traffic connections.

A label-switching technique, which is used in network 1 to implement the traffic connection, i.e. LSP 5, and associated monitoring connection, i.e. LSP 6, will now be described with reference to FIG. 1. Line 10 shows an OAM packet flowing from node B to node D as it may appear at each hop of the connection path B-C-D. Line 20 shows a data packet flowing from node A to node E as it may appear at each hop of the connection path A-B-C-D-E. Labels are represented with the following notation: D(C) represents a label allocated by node C to an LSP the destination of which is node D.

As shown, in the OAM packet of line 10, the top-most label field 11 contains the labels allocated to the LSP 6 by the nodes located on the connection path. Here, it is assumed that each node uses a label allocated by the next hop, as it would be the case for labels allocated through conventional RSVP signaling. The second label field 12 contains a specific OAM label denoted LFU that serves to discriminate OAM packets from data traffic. A network-wide reserved label value may be used for this purpose, e.g. 13 or 14. Field 13 refers to the rest of the OAM packet, which need not be detailed here. It may include an Associated Channel Header (ACH) as defined in IETF Request For Comment 4385.

In the data packet of line 20, along the segment that is covered by LSP 6 (namely B-C-D), the top-most label field 21 contains the same labels as the OAM packets, namely the labels allocated to the LSP 6. Along this segment, the field 22 containing the labels allocated to the LSP 5 is at a second position in the label stack. Outside of the monitored segment, the field 22 is at the top-most position. In other words, label stacking occurs at node B and label popping occurs at node D for the packets of LSP 5. Again, in field 22, it is assumed that each node uses a label allocated by the next hop, as it would be the case for labels allocated through conventional RSVP signaling. Field 23 refers to the rest of the data packet, which need not be detailed here. Field 23 may include further label fields, e.g. in case the LSP 5 is used as a tunnel for client connections, such as further LSPs or Pseudowires. In other words, the label stack of the data packets may have more than two levels.

With reference to FIGS. 2 to 5, methods for establishing the LSPs 5 and 6 in the network of FIG. 1 will now be described. The methods will be described with the RSVP-TE protocol and in cases where the monitoring connection is a TCME-LSP. Other signaling protocols may be used as well. Since the set up of LSPs using RSVP-TE is well known in the art, it is not necessary to detail every object that is carried by the RSVP-TE messages. Especially, traffic parameters can be specified in the conventional manner to reserve and allocate resources in the nodes.

Figure 2:
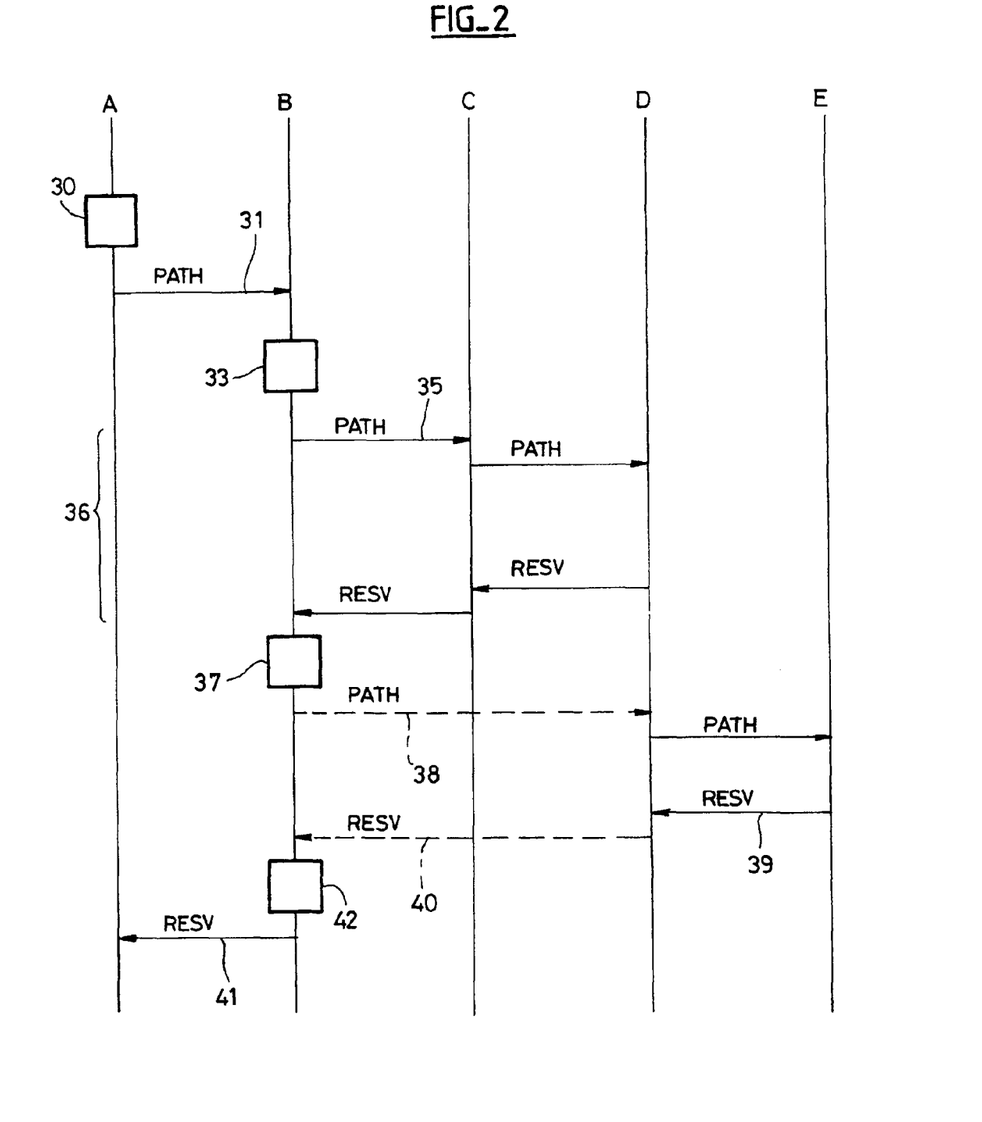
FIG. 2 is a flow diagram showing a first embodiment of a signaling process suitable for establishing the connections of FIG. 1.

A first method, which will be described with reference to FIG. 2, is applicable when a need for the traffic connection 5 and the associated monitoring connection 6 becomes known at the ingress node A prior to establishing any of those connections. For example, a Network Management System (NMS) may communicate such a need to node A as instructions in any suitable language, e.g. Simple Network Management Protocol, Common Open Policy Service or Command Line Interface.

At step 30, node A is informed of the need to establish an LSP along the path A-B-C-D-E with some given traffic parameters and to establish an associated TCME-LSP along the segment B-C-D of the connection path.

At step 31, node A generates a PATH message comprising the information necessary to establish the LSP, e.g. LSP 5. This information may be put in the standard objects. In addition, the PATH message comprises an object intended to communicate the need for the TCME-LSP to the ingress of the TCME-LSP, e.g. node B. Here "ingress" is defined with respect to the signaling process. The TCME-LSP may operate in both directions in the end. This object contains at least identifiers of the ingress and egress nodes of the TCME-LSP to be established, e.g. IP addresses.

Figure 3:
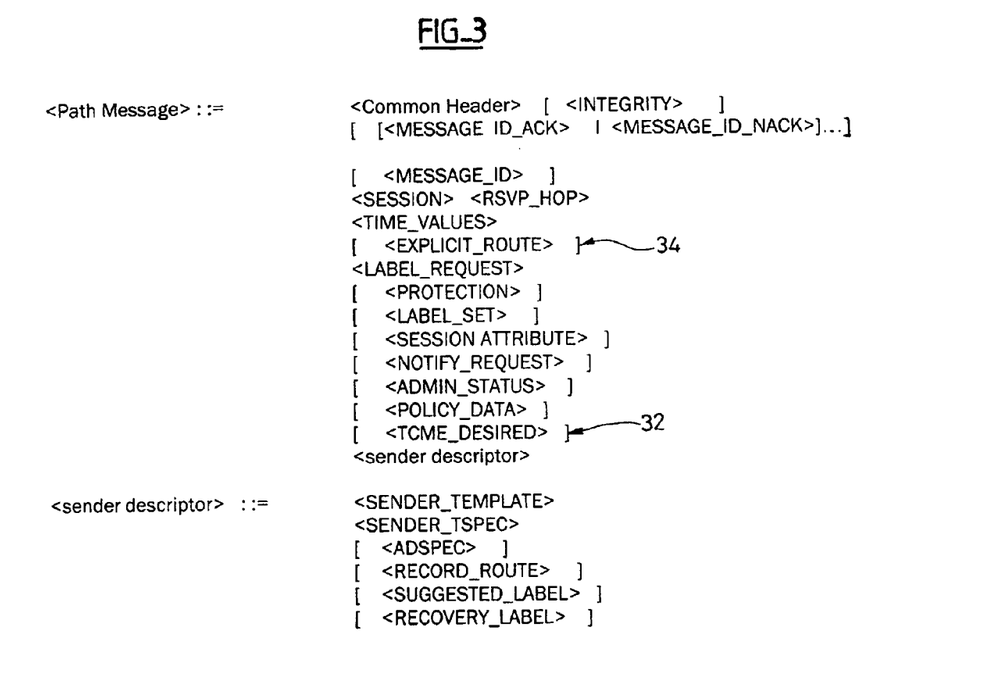
FIG. 3 shows a signaling message format, which may be used in the process of FIG. 2.

FIG. 3 illustrates a format suitable for the PATH message of step 31. In this example, the additional object 32 is called TCME_DESIRED and is provided as an extension to existing RSVP-TE standards. A different object name could be used as well. The LSP route may be specified in an object 34 called EXPLICIT_ROUTE (ERO). When the objects 32 and 34 are both used, the nodes identified in the object 32 must be also named in object 34. If not, node A or any other node should generate an error signal when detecting such a situation.

The PATH message generated at step 31 is routed in the conventional manner along the intended connection path. In addition to usual RSVP-TE processing, each node receiving the PATH message checks whether an object 32 is included. When it is, the node checks whether it is identified as the ingress of the desired TCME-LSP. If not, it passes the message to the next hop in the conventional manner, without changing the object 32.

When the node receiving the PATH message detects that it is identified as the ingress of the desired TCME-LSP, i.e. node B at step 33 in FIG. 2, it halts the signaling of the LSP by not forwarding the message to the next hop. Instead, the node proceeds to establish the TCME-LSP between the two nodes identified in the object 32. Accordingly, at step 35, node B generates a second PATH message.

If an explicit route was specified in the received PATH message, node B includes a corresponding object 34 in the second PATH message to ensure that the TCME-LSP and associated LSP will follow the same path. Preferably, other traffic parameters specified in the first PATH message are given an identical value in the second PATH message to ensure encapsulation will be possible. The second PATH message specifies a destination corresponding to the egress of the desired TCME-LSP, i.e. node D. The object 32 need not be replicated.

In a particular embodiment, the bandwidth requirement specified in the second PATH message is identical to that specified in the first PATH message. Thus, once both LSPs are established and encapsulated, the TCME-LSP will have no available bandwidth. As a consequence, the control plane will be prevented from tunneling any other connection through the TCME-LSP. However, there are other ways to enforce an exclusive association between the TCME-LSP and associated LSP.

As shown in the sequence 36, conventional RSVP-TE signaling processes occur between the ingress and egress node of the TCME-LSP. For example, the labels D(D) and D(C) used in FIG. 1 are allocated by means of the shown RESV messages.

At step 37, having received an RESV message responding to the second PATH message, node B detects that the desired TCME-LSP is established, e.g. LSP 6. Confirmation messages, not shown, can be sent in addition. Then node B proceeds to resume the establishment of the halted LSP so as to encapsulate the LSP into the associated TCME-LSP.

At step 38, label stacking is used to forward the first PATH message through the TCME-LSP 6 to the egress of the TCME-LSP, i.e. node D. The ERO is adapted accordingly. The object 32 is suppressed from the forwarded message. Node D pops the top label and performs conventional RSVP-TE processing to continue the establishment of the LSP. The next hop or hops, e.g. node E, perform conventional RSVP-TE processing. For example, the labels E(E), E(D) and E(B) used in FIG. 1 are allocated by means of the RESV messages shown at numerals 39, 40 and 41. Further details of procedures for encapsulating LSPs are given in IETF RFC 4206.

In each node along the path, RSVP signaling messages serve to configure label-switching tables so as to implement the label stacks shown in FIG. 1. Especially, at step 42 the TCME ingress node, i.e. node B, configures a label switching table so that packets carrying the label which it has allocated to the traffic LSP, e.g. label E(B), are submitted to a label stacking operation prior to forwarding. This label stacking operation implements the encapsulation of incoming packets of LSP 5 into packets of TCME-LSP 6. Due to the encapsulation of the LSPs, OAM packets are handled and processed in a similar manner as the packets of the traffic LSP for which they provide a monitoring service. This feature is also known as fate sharing.

In case a problem occurs during the establishment of the TCME-LSP, the ingress of the TCME-LSP, e.g. node B, can be informed through normal RSVP procedures. In embodiments, this may result in aborting the whole process or in completing the first LSP establishment without establishing the requested TCME-LSP.

In the first method described above, a request for the establishment of the TCME-LSP, e.g. object 32, was embedded in the LSP establishment request, e.g. PATH message 31, and processed by the TCME-LSP ingress, e.g. node B, so as to ensure the automatic association between the two LSPs.

Figure 4:
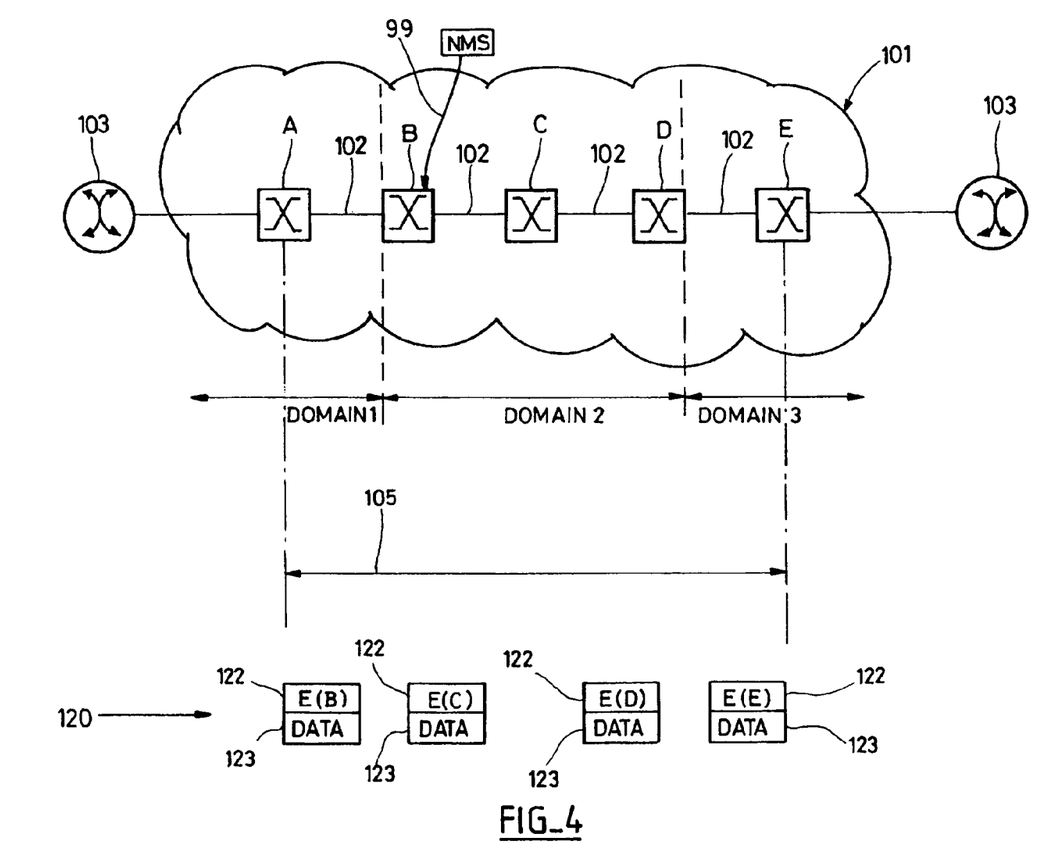
FIG. 4 is a schematic representation of a communication network comprising a traffic connection in which embodiments of the invention may be used.
Figure 5:
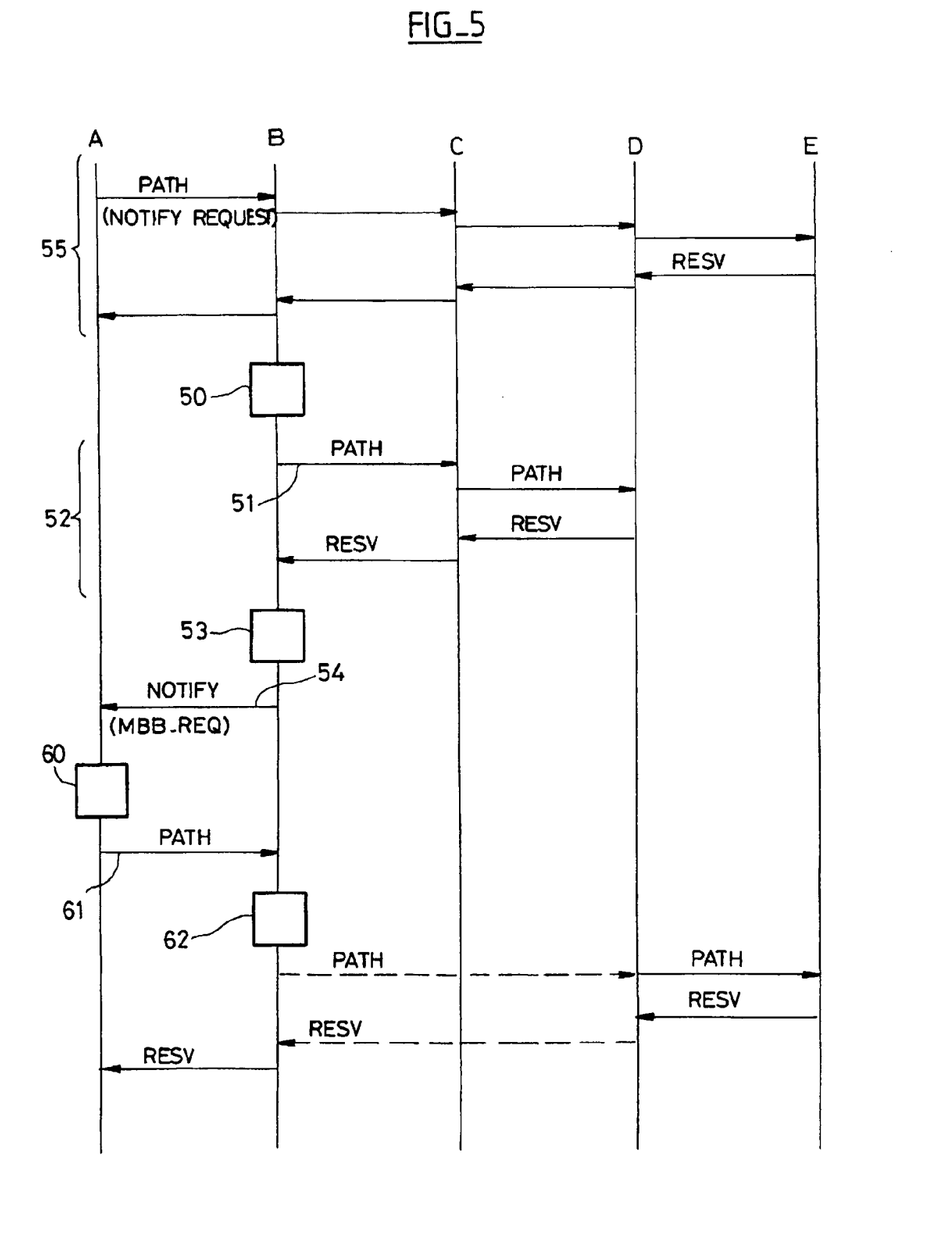
FIG. 5 is a flow diagram showing a second embodiment of a signaling process suitable for establishing the connections of FIG. 1.

A second method, which will be described with reference to FIGS. 4 and 5, is applicable when a need for the monitoring connection 6 becomes known at the ingress of the desired monitoring connection, e.g. node B, after the associated traffic connection 5 was established. An illustrative situation of this type is schematically shown on FIG. 4, in which elements identical or similar to those of FIG. 1 have the same numeral increased by 100.

With reference to FIG. 4, the LSP 105 is established between ingress node A and egress node E. Line 120 shows a data packet flowing from node A to node E as it may appear at each hop of the connection path A-B-C-D-E. In the data packet of line 120, the field 122 containing the labels allocated to the LSP 105 is at the top-most position along the whole path. In field 122, it is assumed that each node uses a label allocated by the next hop, as it would be the case for labels allocated through conventional RSVP signaling. Field 123 refers to the rest of the data packet, which need not be detailed here. Field 123 may include further label fields, e.g. in case the LSP 105 is used as a tunnel for client connections, e.g. further LSPs or Pseudowires.

In the situation depicted on FIG. 4, it may be possible to monitor the performance of the LSP 105 from end to end by sending OAM packets in the LSP. However, it is no possible to monitor the performance of the LSP 105 over a given segment of the connection path, e.g. between two intermediate nodes or between an intermediate node and an end node of the LSP. Performance monitoring over a path segment may be desired for example by an operator who operates a network that covers only a portion of the connection path, e.g. in the case of an inter-domain LSP. In the example shown on FIG. 1, the LSP 105 crosses three network domains belonging to different operators. The operator of the second domain (DOMAIN 2) wants to monitor the performance of the LSP 105 over the path segment belonging to his domain, e.g. segment B-C-D. For example, the purpose of this monitoring may be service level agreement enforcement. One way to achieve such performance monitoring is to establish a TCME-LSP along the segment B-C-D. With reference to FIG. 5, a method suitable to fulfill that need will now be described.

At step 50, node B is informed of the need to establish a TCME-LSP along the segment B-C-D of the connection path. For example, such need may be communicated to node B by a NMS of the second domain as instructions in any suitable language, e.g. Simple Network Management Protocol, Common Open Policy Service or Command Line Interface, as shown by arrow 99 on FIG. 4.

At step 51, node B initiates an RSVP signaling procedure to establish the TCME-LSP with the other end node identified in the received instructions, e.g. node D Accordingly, at step 51, node B generates a PATH message.

To ensure that the TCME-LSP will follow the same path as the established LSP 105, node B specifies a corresponding explicit route in the PATH message. The route information relating to the LSP 105 can be found by the node controller e.g. stored in a Path State Block. Preferably, other traffic parameters relating to the established LSP 105 are given an identical value in the PATH message to ensure encapsulation will be possible. The PATH message specifies a destination corresponding to the egress of the desired TCME-LSP, i.e. node D. In a preferred embodiment, the bandwidth requirement specified in the PATH message is identical to that relating to the LSP 105.

As shown in the sequence 52, conventional RSVP-TE signaling processes occur between the ingress and egress node of the TCME-LSP. For example, the labels D(D) and D(C) used in FIG. 1 are allocated by means of the shown RESV messages.

At step 53, having received an RESV message responding to the PATH message, node B detects that the desired TCME-LSP is established, e.g. LSP 6 of FIG. 1. Confirmation messages, not shown, can be sent in addition. In order to render the TCME-LSP operational, it is still needed to encapsulate the traffic LSP into the TCME-LSP. For that purpose, at step 54, node B requests the ingress of the traffic LSP 105, i.e. node A, to re-establish the traffic LSP 105 using make-before-break operations.

Preferably, the request is sent at step 54 in a NOTIFY message of the RSVP-TE protocol, which is a fast notification message. This is only possible if a corresponding Notify request object has been previously deposited in the nodes along the connection path to request the generation of notifications towards node A, as described in IETF RFC 3473. The notify request object may have been deposited during the initial establishment of the LSP 105, which is outlined in the sequence 55 of FIG. 5 or later on.

The request sent at step 54 contains instructions to cause node A to re-establish the traffic LSP 105 along the traffic connection path using a make-before-break (MBB) signaling procedure, i.e. instructions which will be interpreted as a request to perform the MBB operations. These instructions may be provided in any suitable format.

As an example, a Notify message sent at step 54 contains an object of a new RSVP Class the name of which could for example be MBB_REQ. Two objects may be defined for that Class: an IPv4 MBB_REQ object containing an IPv4 address of the intermediate node requesting MBB to be performed, e.g. node B; and an IPv6 MBB_REQ object containing an IPv6 address of this node, as the case may be. These objects could optionally contain additional information of potential use by the ingress node for the MBB operation: an IPv4 or IPv6 address of the end-point of the TCME-LSP, i.e. node D and/or an identifier of the TCME-LSP, e.g. an LSP ID or Tunnel ID of LSP 6.

At step 60, the ingress node, i.e. node A receives the Notify message and detects the MBB-REQ object. Session information in the Notify message enables the node A to identify that the request relates to the LSP 105.

At step 61, the ingress node, e.g. node A generates RSVP-TE signaling to re-establish the traffic LSP using make-before-break operations. In other words, the LSP 5 will be established as a new LSP along the same path as the existing LSP 105, and then the older LSP 105 will be torn down.

Make-before-break operations enable to establish a new LSP in such a way that on links that are common to the old and new LSPs, resources used by the old LSP are not be released before traffic is transitioned to the new LSP, and reservations are not be counted twice, which might otherwise cause Admission Control to reject the new LSP. Make-before-break RSVP-TE signaling procedures are described in IETF Request for Comment 3209, which is incorporated herein by reference. According to RFC 3209, to effect a reroute, the ingress node picks a new LSP ID and forms a new SENDER_TEMPLATE. The ingress node then creates a new ERO to define the new path. Thereafter the node sends a new Path Message using the original SESSION object and the new SENDER_TEMPLATE and ERO. It continues to use the old LSP and refresh the old Path message. On links held in common, the shared SESSION object and SE style allow the LSP to be established sharing resources with the old LSP. Once the ingress node receives a RESV message for the new LSP, it can transition traffic to it and tear down the old LSP.

At step 61, "Re-establishing" here means rerouting along the same path. Hence, at step 61, the node A sends a new Path Message in the manner described in RFC 3209, except that the ERO and SENDER_TEMPLATE remain the same in the old and new LSPs.

At step 62, upon receiving the PATH message, node B uses session information to detect that it relates to the LSP for which the TCME-LSP has been established and then proceeds to establish the new LSP, i.e. LSP 5, encapsulated in the TCME-LSP 6. The signaling process is completed in a very similar manner as the steps 38 to 42 of FIG. 2. Although the same notations have been used in the fields 22 and 122 of FIGS. 1 and 4, it should be noted that the labels allocated by the nodes E, D and B to the re-established LSP, i.e. LSP 5 may or may not be identical to the labels allocated to the initial LSP 105.

Figure 6:
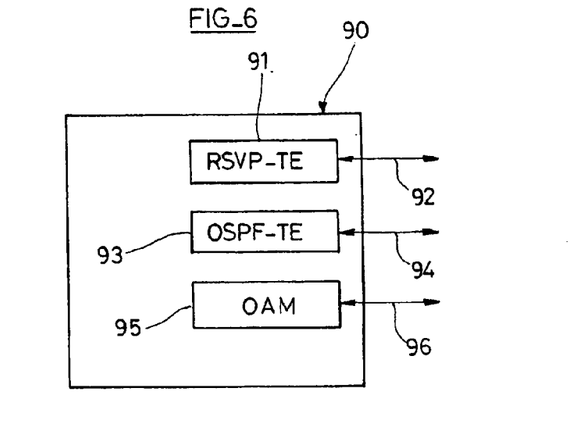
FIG. 6 is a functional diagram of a node controller, which can be used to perform the process of FIG. 2 or 5.

With reference to FIG. 6, a node controller 90 suitable for implementing the above methods is schematically shown. The node controller comprises a signaling module 91, e.g. operating in accordance with the RSVP-TE protocol and appropriate extensions, which initiates and terminates signaling messages 92. A routing module 93, e.g. operating in accordance with the OSPF-TE protocol, initiates and terminates routing messages 94. The signaling and routing messages may be transported in band or out of the band, e.g. through a separate control network overlaid on the data network. An OAM module 95 initiates and terminates OAM flows 96. The OAM flows are transported in band. Various other functional modules, not shown, may also be included.

A network management system can be a hardware device, for example a personal computer, a workstation, an Internet appliance, or other general purpose or specific purpose communications device. A software program running on this system performs network management functions to control the network elements.

The methods described above can be implemented with diverse versions or extensions of MPLS, including GMPLS and MPLS-TP, or with other connection-oriented protocols.

Embodiments of the invention may be implemented by means of hardware as well as software. The same item of hardware may represent several « modules ». . The functions of the various elements shown in the Figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive.

The invention is not limited to the described embodiments. The appended claims are to be construed as embodying all modification and alternative constructions that may be occurred to one skilled in the art, which fairly fall within the basic teaching here, set forth. The order of some method steps shown on the figures may be modified to achieve a similar result. Some steps may be performed simultaneously.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. A method for establishing a monitoring connection associated to a traffic connection established in a communication network, the method comprising the steps of:

sending a connection establishment message from a first node to a second node of the communication network to establish a monitoring connection between the first and second nodes, wherein the first and second nodes are disposed in a path of the traffic connection and the connection establishment message is sent along the traffic connection path;

sending a make-before-break request from the first node to an ingress node of the traffic connection to cause the ingress node to re-establish the traffic connection along the traffic connection path using a make-before-break signaling procedure; and at the first node, processing a re-establishment signaling message sent by the ingress node so as to encapsulate the re-established traffic connection into the monitoring connection.

2. The method in accordance with claim 1, wherein the traffic connection and associated monitoring connection are label-switched paths and the re-established traffic connection is encapsulated into the monitoring connection through label stacking.

3. The method in accordance with claim 1, further comprising the step of sending an operations, administration and maintenance (OAM) flow between the first and second nodes through the monitoring connection.

4. The method in accordance with claim 1, wherein the monitoring connection is established with a same bandwidth as the traffic connection.

5. The method in accordance with claim 1, wherein the connection establishment message and the re-establishment signaling message are in accordance with a Resource Reservation Protocol-Traffic Engineering (RSVP-TE) protocol.

6. The method in accordance with claim 1, wherein the make-before-break request comprises an identifier of the first node.

7. The method in accordance with claim 1, wherein the make-before-break request comprises an identifier of the second node.

8. The method in accordance with claim 1, wherein the make-before-break request comprises an identifier of the monitoring connection.

9. The method in accordance with claim 1, wherein the make-before-break request comprises an object in an RSVP-TE Notify message.

10. A node controller for a network node, the controller comprising a signaling module adapted to perform operations comprising:

- sending a connection establishment message from the network node in which the node controller is installed to another node of a communication network to establish a monitoring connection between the said nodes, wherein the said nodes are disposed in a path of a traffic connection established in the communication network and the connection establishment message is sent along a path of the traffic connection;
- sending a make-before-break request to an ingress node of the traffic connection to cause the ingress node to re-establish the traffic connection along the traffic connection path using a make-before-break signaling procedure; and
- processing a re-establishment signaling message received from the ingress node so as to encapsulate the re-established traffic connection into the monitoring connection.

11. The node controller in accordance with claim 10, further comprising an operations, administration and maintenance (OAM) module adapted to send an OAM flow to the other node through the monitoring connection.

12. The node controller in accordance with claim 10, wherein the signaling module is adapted to configure a switching table so as to associate an incoming label of the re-established traffic connection with an outgoing label of the monitoring connection.

13. A non-transitory computer-readable storage medium having computer readable instructions, which when executed by a processor in a node controller causes the node controller to perform operations comprising:

- sending a connection establishment message from a network node in which the node controller is installed to another node of a communication network to establish a monitoring connection between the said nodes, wherein the said nodes are disposed in a path of a traffic connection established in the communication network and the connection establishment message is sent along a path of the traffic connection;
- sending a make-before-break request to an ingress node of the traffic connection to cause the ingress node to re-establish the traffic connection along the traffic connection path using a make-before-break signaling procedure; and
- processing a re-establishment signaling message received from the ingress node so as to encapsulate the re-established traffic connection into the monitoring connection.

* * * * *